United States Patent
Orehek (10) Patent No.: US 10,456,655 B1
(45) Date of Patent: Oct. 29, 2019

(54) RACK FOR STORING FREE WEIGHT PLATES FOR WEIGHTLIFTING

(71) Applicant: Allen J. Orehek, Waymart, PA (US)

(72) Inventor: Allen J. Orehek, Waymart, PA (US)

( * ) Notice: Subject to any disclaimer, the term of this patent is extended or adjusted under 35 U.S.C. 154(b) by 162 days.

(21) Appl. No.: 15/624,160

(22) Filed: Jun. 15, 2017

(51) Int. Cl.
| | |
|---|---|
| A63B 71/00 | (2006.01) |
| A63B 21/072 | (2006.01) |
| A47B 81/00 | (2006.01) |
| B62B 3/10 | (2006.01) |
| B62B 5/06 | (2006.01) |
| B62B 5/00 | (2006.01) |

(52) U.S. Cl.
CPC ........ *A63B 71/0036* (2013.01); *A47B 81/007* (2013.01); *A63B 21/072* (2013.01); *B62B 3/108* (2013.01); *B62B 5/0033* (2013.01); *B62B 5/0076* (2013.01); *B62B 5/06* (2013.01)

(58) Field of Classification Search
None
See application file for complete search history.

(56) References Cited

U.S. PATENT DOCUMENTS

| | | | |
|---|---|---|---|
| 6,406,409 B1 | 6/2002 | Silver | |
| D468,946 S | 1/2003 | Harms et al. | |
| 6,974,039 B2 | 12/2005 | Comartin et al. | |
| 8,479,930 B1 | 7/2013 | Cohen | |
| 2010/0179033 A1 | 7/2010 | Perry et al. | |
| 2015/0104279 A1* | 4/2015 | Kenton | B66F 9/06 414/460 |
| 2015/0258412 A1 | 9/2015 | Doerr | |
| 2015/0344053 A1* | 12/2015 | McClanahan | B62B 3/02 280/35 |
| 2016/0059104 A1* | 3/2016 | Monaco | E04H 3/14 280/30 |
| 2016/0059875 A1* | 3/2016 | Segman | B62B 5/0063 701/24 |

OTHER PUBLICATIONS

Perform Better! PB Extreme Portable Plate Rack, http://www.performbetter.com/webapp/wcs/stores/servlet/Product1_10151_10751_2259033_-1, Apr. 21, 2016.
Rogue V2 Bumper Stacker, https://www.roguefitness.com/rogue-v2-bumper-stacker, Oct. 8, 2013.

* cited by examiner

*Primary Examiner* — Tamara L Weber
(74) *Attorney, Agent, or Firm* — Caesar Rivise, PC (57) ABSTRACT

A rack for storing a plurality of cylindrical free weight plates for weightlifting is provided, wherein the cylindrical free weight plates have an outer diameter with a peripheral edge, and each weight plate is of like diameter. The rack includes a planar base sized to support free weight plates stacked in a horizontal configuration, and a plurality of spaced apart uprights disposed generally vertically on the base, and wherein each upright receives the peripheral edges of the plurality of weight plates.

5 Claims, 7 Drawing Sheets

RACK FOR STORING FREE WEIGHT PLATES FOR WEIGHTLIFTING

BACKGROUND OF THE INVENTION

The present invention is directed to free weight racking systems. More particularly, the present invention is directed to a free weight racking systems for storing and cylindrical, plate-type weights for use in weightlifting.

Free weights for weightlifting have been used for decades consist primarily of dumbbells, barbells, and other devices that can be freely moved and manipulated around the fitness center or gym. Often, this medium of exercise requires the individual to place one, or a plurality of weight lifting plates or discs of various sizes onto a particular exercise machine or device to achieve the desired resistance. Such plates typically comprise a circular solid steel object of varying weight.

The weight, and accordingly, the overall plate dimensions correspond to one of several standard plate sizes. Once the individual concludes the exercise, the weight plates need to be returned to a storage or holding implement, such as a rack, which may be a free standing device. These storage implements are typically called "weight trees." These implements are dispersed throughout the fitness center to provide individuals a place to retrieve and return the plates before and after completing free weight exercises.

The traditional design of these weight storage implements utilize a 1-inch (Standard) or a 2-inch (Olympic) center opening that exist on substantially all weight lifting plates, adapted to receive a bar end or support post. The 1-inch design is used primarily for home fitness products, whereas the 2-inch center opening is used almost exclusively in commercial fitness settings. These implements use single, outwardly projecting cylindrical or square shaped support posts that are small enough to pass through the center opening of the plates as a means for supporting the weight. The weights are stored by simply placing the center opening of the plate over the single support post and allowing the plate to come to rest on the support post or its connected frame. These support posts can be of varying lengths and are designed to allow multiple plates to be placed on any one given post, thus making efficient use of the storage space.

The weight plates previously mentioned come in seven typical sizes or weights. All fitness equipment manufacturers most commonly produce plates in these weights: 100 pounds (45.3 Kg), 45 pounds (20.4 Kg), 35 pounds (15.9 Kg), 25 pounds (11.3 Kg), 10 pounds (4.6 Kg), 5 pounds (2.2 Kg) and 2.5 pounds (1.1 Kg). In order to allow these plates to work universally with all plate-loaded equipment, an industry standard of 1 or 2-inch center openings exist on substantially all plates, regardless of size/weight.

However, when a relatively large number of free weight plates are desired to be stored on a single rack, it is highly desirable to store such plates stacked with the weights in a horizontal configuration. A rack is known that provides for an upright vertical one inch or two inch rod, wherein the rod receives each weight plate with its common 1-inch (Standard) or a 2-inch (Olympic) center opening, such that a plurality of weight plates are horizontally stacked with the rod through the holes stabilizing and supporting the stacked weight plates.

However, with such a system, a user of the rack must lift each weight to the top of the upright vertical rod and lowered until it reaches the base of the rack (or the top of the previously stacked weight plates).

Some examples of existing patens for storing free weight plates include the following. U.S. Pat. No. 6,406,409 (Silver) is directed to a free weight racking system. The weight plates are of at least two different sizes. The rack has a set of at least two parallel, substantially horizontal posts that corresponds to each size weight plate. Each set of posts includes a bar hole post and at least one racking hole post complementary to the size shape and location of the racking hole.

U.S. Pat. Pub. No. 2015/0258412 (Doerr) is directed to a free weight organization system that prevents misplacement of the free weight plates on the weight rack. The system includes weight plates with recesses and keyed weight rack posts with corresponding projections. The placement of the recesses varies from one size of weight plate to another, preventing a weight plate of the wrong sized being placed on a rack post of the weight rack.

U.S. Des. Pat. No. D468,946 (Harms et al.) is directed to the design of a weight plate support tree having a U-shaped base, and a gently arcing upright with horizontal members to hold weight plates.

U.S. Pat. Pub. 2010/0179033 (Perry et al.) is directed to a system and apparatus for storage and use of free weights. The cylindrical weights are stored vertically, on their edges.

U.S. Pat. No. 6,974,039 (Comartin et al.) is directed to a multi-member support storage implement for weight lifting plates such that the weights cannot be placed incorrectly.

U.S. Pat. No. 8,479,930 (Cohen) is directed to an organizing system for weights and accessories having a base with a support bar extending upwardly from the base, a container with a lid on top of the support bar, weight rack shafts extending horizontally from the support bar for holding weights, and similar features.

All references cited herein are incorporated herein by reference in their entireties.

BRIEF SUMMARY OF THE INVENTION

A rack for storing a plurality of cylindrical free weight plates for weightlifting is provided, wherein the cylindrical free weight plates have an outer diameter with a peripheral edge, and each weight plate is of like diameter. The rack includes a planar base sized to support free weight plates stacked in a horizontal configuration, and a plurality of spaced apart uprights disposed generally vertically on the base, and wherein each upright receives the peripheral edges of the plurality of weight plates.

The base may have a width equal to or greater than the outer diameter of the free weight plates. The uprights may be disposed on an upper surface of the planar base. A top rail may be provided that is disposed between at least two of the spaced apart uprights. A set of wheels may be disposed on the base, such that the rack is movable on the wheels. A handle may be disposed on the base for use by a user to pull the rack to a desired position. Finally, a motor system, steering system, processor, and appropriate transmission hardware, for control by a smart phone application may also be provided.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following embodiments, but it should be understood that the present invention is not deemed to be limited thereto.

Referring now to the drawing figures, wherein like part numbers refer to like elements throughout the several views, there is shown in FIGS. 1-7 a rack for storing a plurality of cylindrical free weight plates for weightlifting 10, in accordance with a first exemplary embodiment of the present invention. The rack 10 is for supporting the cylindrical free weight plates 12, each having a like outer diameter 14 and having a peripheral edge 16. See FIGS. 1-3. The rack 10 includes a base 18, for example, a planar sheet of metal, having a width 20 equal to or greater than the outer diameter 14 of the free weight plates 12. The base 18 is sized to support the free weight plates 12 stacked in a horizontal configuration. While a planar sheet of metal is shown in the drawing figures, it is understood that any structural element or elements is considered to be within the scope of the claimed invention, so long as it supports the weight plates 12 in a horizontal configuration, for example, a set of welded tubular members or a set of welded beams.

A plurality of spaced apart uprights 22 is disposed in a generally vertical orientation on an upper surface 24 of the base 18, each upright 22 abutting the peripheral edges 16 of the of weight plates 12. One or more of the uprights 22 may have one or more strengthening gussets (or angled struts) 26 to help rigidize the rack 10 due to the fact that it must be capable of holding the substantial amount of weight of the weight plates 12.

A set of wheels 28 disposed on the base, such that the rack is movable on said wheels.

A top rail 30 may be disposed between at least two of the spaced apart uprights 22, for additional structural integrity and for use as a hand rail for moving the rack 10 about on its wheels 28.

A "wagon-type" handle 32 may be disposed on the rack 10, preferably secured to the base 18 for use by a user to pull the rack to a desired position.

Figure 1:
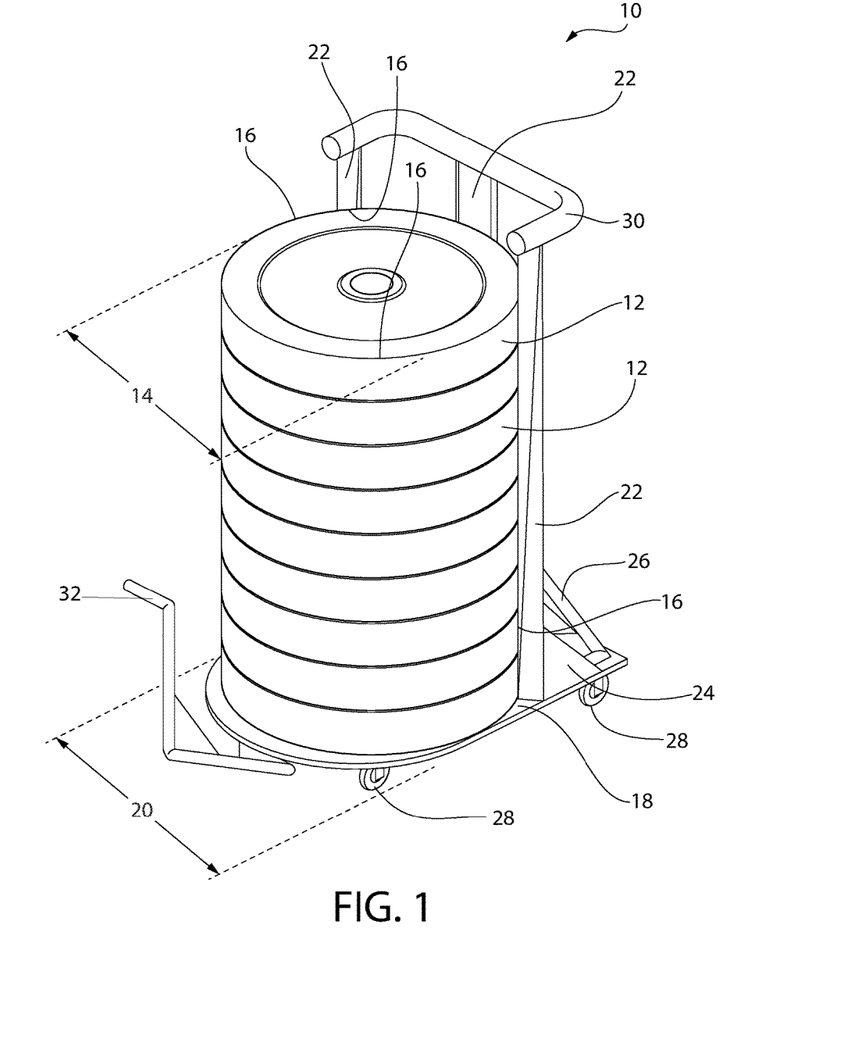
FIG. 1 is a front isometric view of a rack for storing a plurality of cylindrical free weight plates for weightlifting, shown with a stack of weight plates disposed thereon, in accordance with an exemplary embodiment of the present invention.
Figure 2:
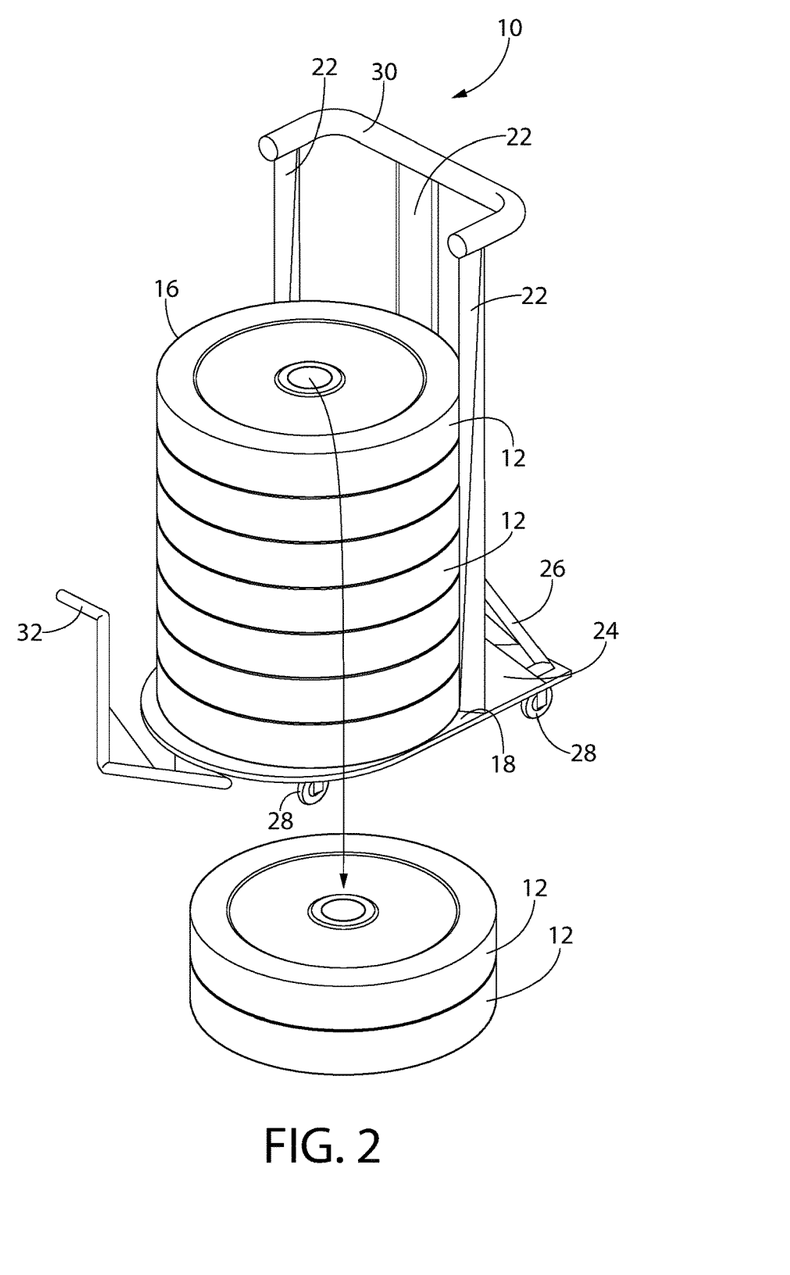
FIG. 2 is a front, isometric view of the rack for storing free weight plates of FIG. 1, with a partial stack of weight plates disposed thereon, shown while being unloaded.
Figure 3:
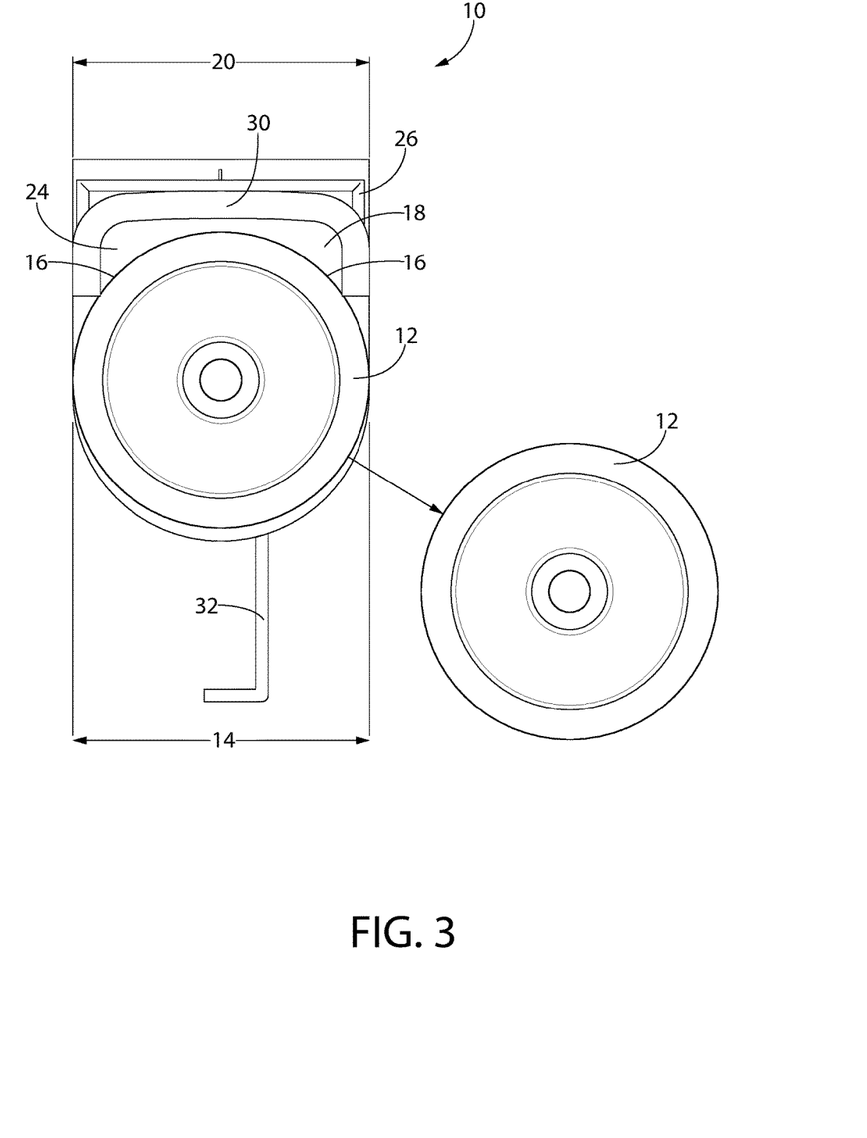
FIG. 3 is a top, plan view of the rack for storing free weight plates of FIG. 1, with a partial stack of weight plates disposed thereon, shown while being unloaded.
Figure 4:
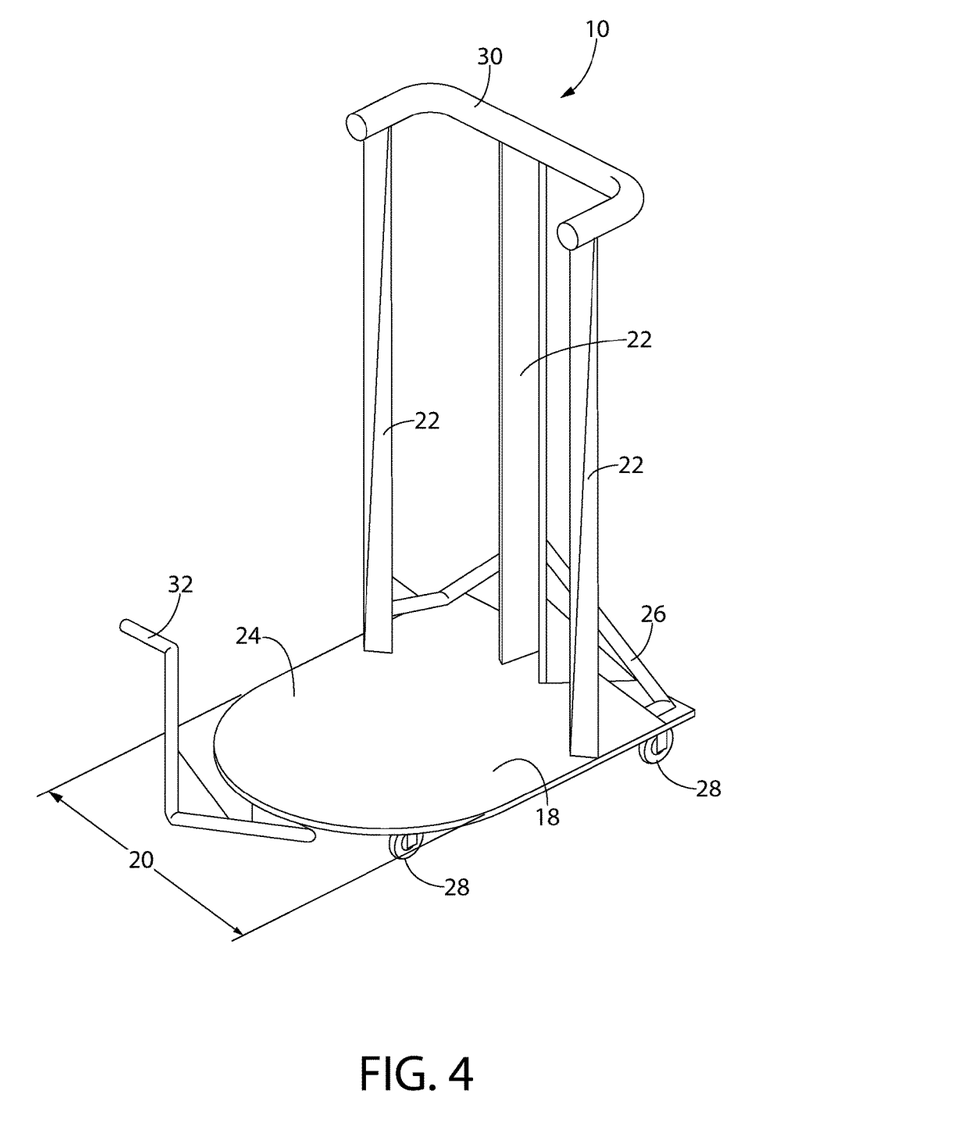
FIG. 4 is a front isometric view of the rack for storing free weight plates of FIG. 1, shown without weight plates thereon.
Figure 5:
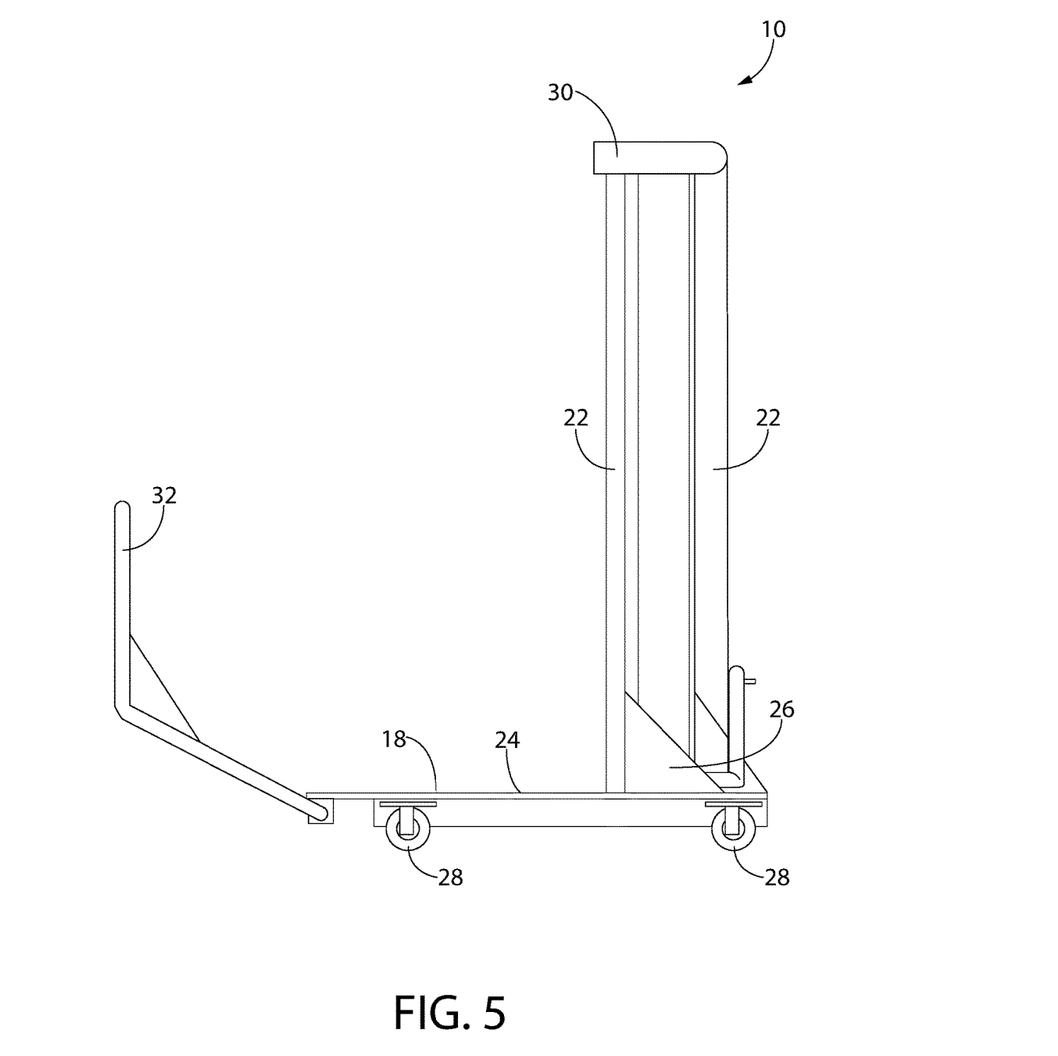
FIG. 5 is a side elevation view of the rack for storing free weight plates of FIG. 1, shown without weigh plates thereon.
Figure 6:
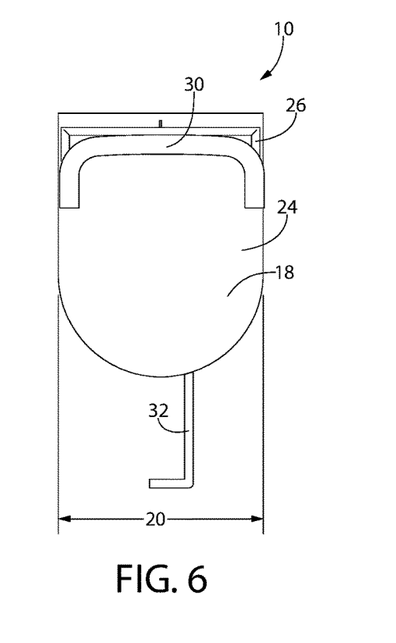
FIG. 6 is a top, plan view of the rack for storing free weight plates of FIG. 1, shown without weight plates thereon.
Figure 7:
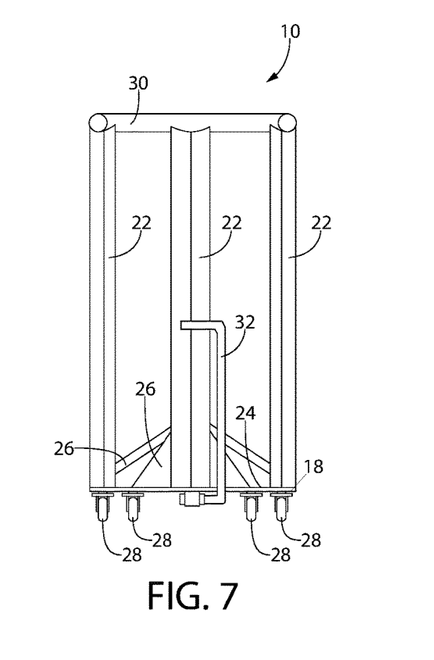
FIG. 7 is a front elevation view of the rack for storing free weight plates of FIG. 1, shown without weight plates thereon.
Figure 8:
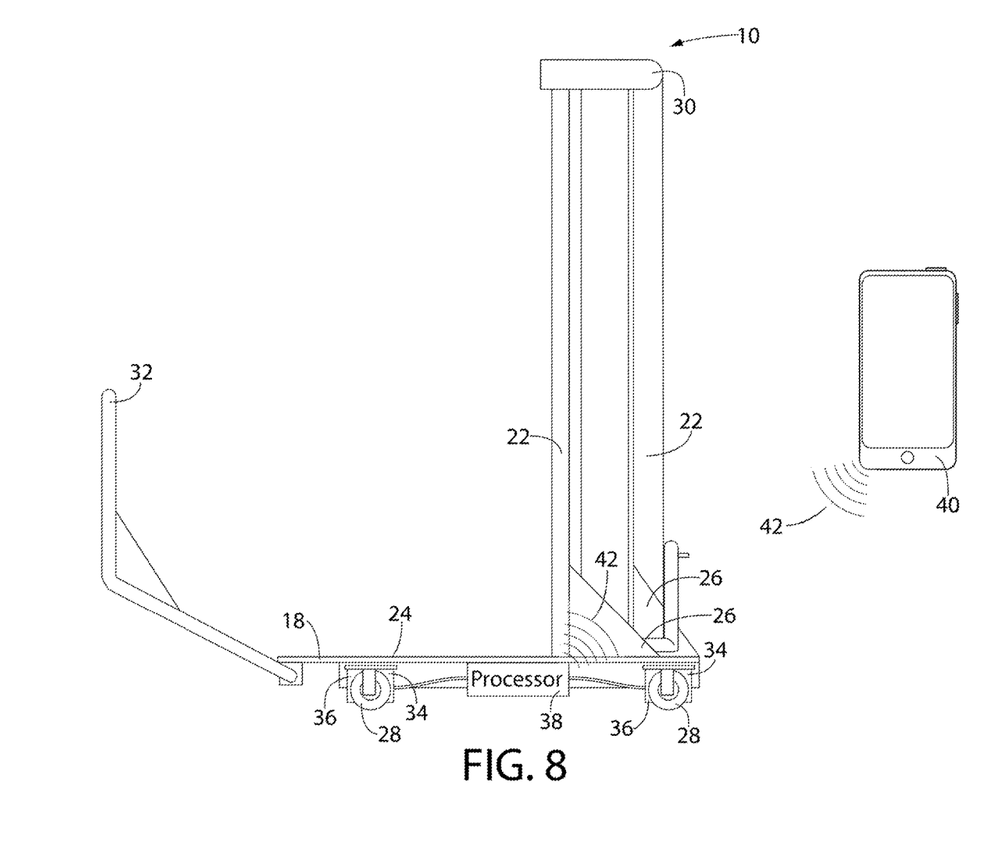
FIG. 8 is a side, elevation view of the rack for storing weight plates of FIG. 1 with a simplified, block diagram of an optional motorized configuration, controllable by a smart phone software application.

Finally, as best seen in FIG. 8 the rack 10 may further include a motor system 34, steering system 36 coupled to the motor system and wheels 28, a processor 38, a power supply (such as a battery, not shown) and appropriate transmission hardware (not shown) 40, for wireless control 42 by a smart phone 40 application. One skilled in the art of controls would easily be able to ascertain appropriate hardware and develop appropriate software for such a control system.

What is claimed is:

1. A weight lifting storage system comprising:
a plurality of cylindrical free weight plates for weight lifting, each of said cylindrical free weight plates having an outer diameter with a peripheral edge, each of said peripheral edges having a first portion, a second portion and a third portion, with each of said cylindrical free weight plates being of like diameter; and
a rack for storing each of said cylindrical free weight plates in a single stack with all of said cylindrical free weight plates of said stack being axially aligned and disposed horizontally, said rack comprising:
a planar base having a front edge and an oppositely disposed rear edge, said planar base being sized to support only a single stack of said cylindrical free weight plates thereon with each of said cylindrical free weight plates of said stack being axially aligned along a vertical axis;
a set of wheels disposed on said planar base, such that said rack is movable on said wheels, said set of wheels including a pair of front wheels and a pair of rear wheels, said front wheels being located adjacent said front edge and spaced apart from each other by a first distance, said rear wheels being located adjacent said rear edge and between said rear edge and first and second spaced apart uprights, said rear wheels being spaced apart from each other by a second distance, greater than said first distance, said front wheels being located closer to said vertical axis than said rear wheels;
a handle disposed on said planar base for use by a user to move said rack to a desired position; and
said first and second spaced apart uprights disposed adjacent said rear edge and extending upward generally vertically on said planar base, said first and second spaced apart uprights being configured to receive said first and second portions, respectively, but not said third portions of each of said cylindrical free weight plates of said stack, with said third portions of each of said cylindrical free weight plates of said stack being located between said first and second portions and facing said front edge, whereupon all of said cylindrical free weight plates of said stack are supported on said rack in a stable configuration centered on said vertical axis but with said third portions being unconstrained by any upright to enable each of said plurality of cylindrical free weight plates to be removed from said single stack across said front edge.

2. The system of claim 1, wherein the first and second spaced apart uprights are disposed on an upper surface of the planar base.

3. The system of claim 1, further including a top rail disposed between the first and second spaced apart uprights.

4. The system of claim 1, additionally comprising a third upright disposed adjacent said rear edge and extending upward generally vertically on said planar base.

5. The system of claim 1, wherein said handle is disposed on said planar base adjacent said front edge.

\* \* \* \* \*

UNITED STATES PATENT AND TRADEMARK OFFICE
CERTIFICATE OF CORRECTION

PATENT NO.         : 10,456,655 B1
APPLICATION NO.    : 15/624160
DATED              : October 29, 2019
INVENTOR(S)        : Allen J. Orehek It is certified that error appears in the above-identified patent and that said Letters Patent is hereby corrected as shown below:

In the Specification

On Line 8 of Column 1, replace the word "systems" with --system--.

On Line 1 of Column 2, replace the word "patens" with --patents--.

On Line 8 of Column 2, insert a --,-- after the word "size".

On Line 16 of Column 2, replace the word "sized" with --size--.

On Line 14 of Column 3, replace the word "weigh" with --weight--.

On Line 55 of Column 3, replace the words "the of weight plates 12" with --the weight plates 12--.

On Line 8 of Column 4, delete the number "40".

Signed and Sealed this
Twenty-eighth Day of July, 2020

Andrei Iancu
*Director of the United States Patent and Trademark Office*